Oct. 8, 1940. P. HOLLSTEIN 2,216,777
CONCHE MACHINE
Original Filed April 12, 1937 3 Sheets-Sheet 1

INVENTOR.
PAUL HOLLSTEIN
BY
ATTORNEY.

Oct. 8, 1940.   P. HOLLSTEIN   2,216,777
CONCHE MACHINE
Original Filed April 12, 1937   3 Sheets-Sheet 2

INVENTOR.
PAUL HOLLSTEIN
BY C. P. Goepel
ATTORNEY.

Oct. 8, 1940.    P. HOLLSTEIN    2,216,777
CONCHE MACHINE
Original Filed April 12, 1937    3 Sheets-Sheet 3
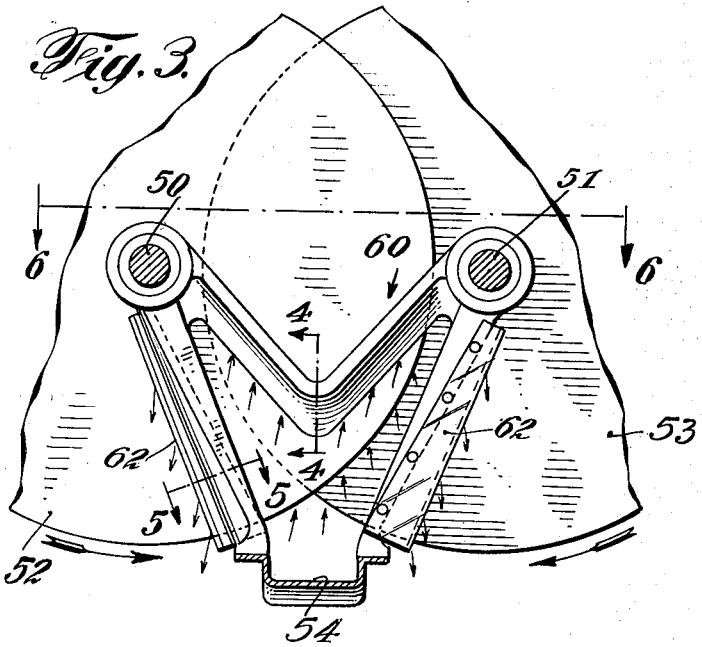
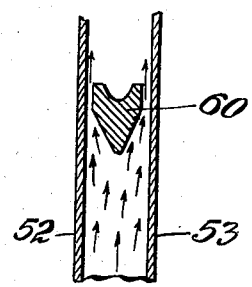
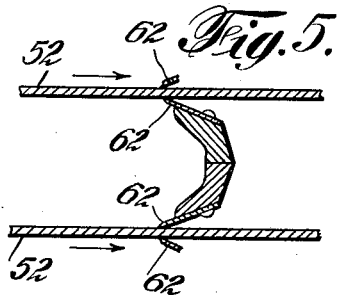
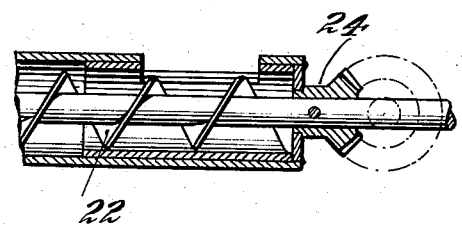
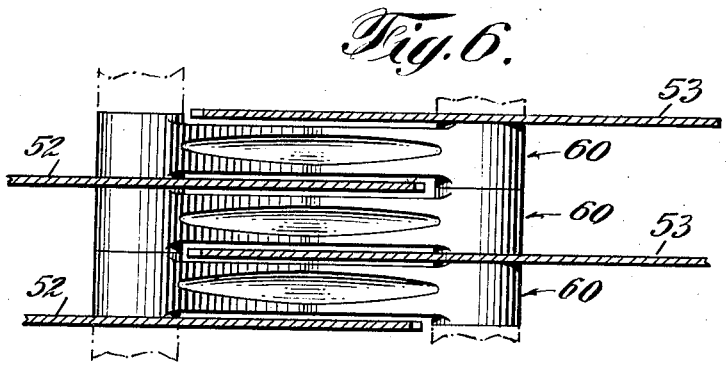
INVENTOR.
PAUL HOLLSTEIN
BY
ATTORNEY.

Patented Oct. 8, 1940

2,216,777

UNITED STATES PATENT OFFICE 2,216,777

CONCHE MACHINE

Paul Hollstein, Carlstadt, N. J., assignor to J. M. Lehmann Company, Inc., New York, N. Y., a corporation of New York Application April 12, 1937, Serial No. 136,295
Renewed October 5, 1938

12 Claims. (Cl. 99—23)

This invention relates to a conche machine and has for its main object to produce a grade of chocolate or cocoa equal in quality to the finest now produced in a much shorter time and without sacrifice of any of the benefits of other processes used heretofore which depend on a longer processing time.

The invention provides a shaft having a series of blades affixed thereto which serve to beat the chocolate or cocoa, and, after such continuous beating, subjecting it to alternate aeration and beating. In the aeration step, the chocolate is spread upon a disc or discs in a very fine layer and is subjected to air of a proper temperature, which aeration improves the quality in that certain beneficial changes occur and objectionable volatile constituents are removed.

By the beating in the beaters, by the thinning out upon the discs, and the scraping therefrom, and subsequent beating, in a continuous cycle, the "charge" or material in the apparatus is gradually changed from that of one characteristic to another. By the use of the improved machine, the time required to achieve that perfection of taste necessary for the highest quality chocolate is materially reduced.

It has not been proposed heretofore to place the chocolate from the beaters on these discs and then scrape it off and have it thrown back into the beaters; and the invention consists also in the combination of such discs with a beater forming one unitary machine. By the use of this improved machine, the chocolate is treated a sufficient length of time until its character is completely changed and is a totally different one from the initial substance in taste, appearance, and capacity of uses.

With the foregoing and other objects in view, the invention will be more fully described hereinafter, and will be more particularly pointed out in the claims appended hereto.

In the accompanying drawings:

Figure 3 is an enlarged view of parts of the discs, of the flattening devices, and of the scrapers, taken on line 3—3 of Figure 2;

Figure 4 is a section taken on line 4—4 of Figure 3;

Figure 5 is a detail section taken on line 5—5 of Figure 3;

Figure 6 is a detail plan view taken on line 6—6 of Figure 3; and

Figure 7 is a detail of the screw feed taken on line 7—7 of Figure 2.

Similar numerals refer to similar parts throughout the several views.

Figure 2:
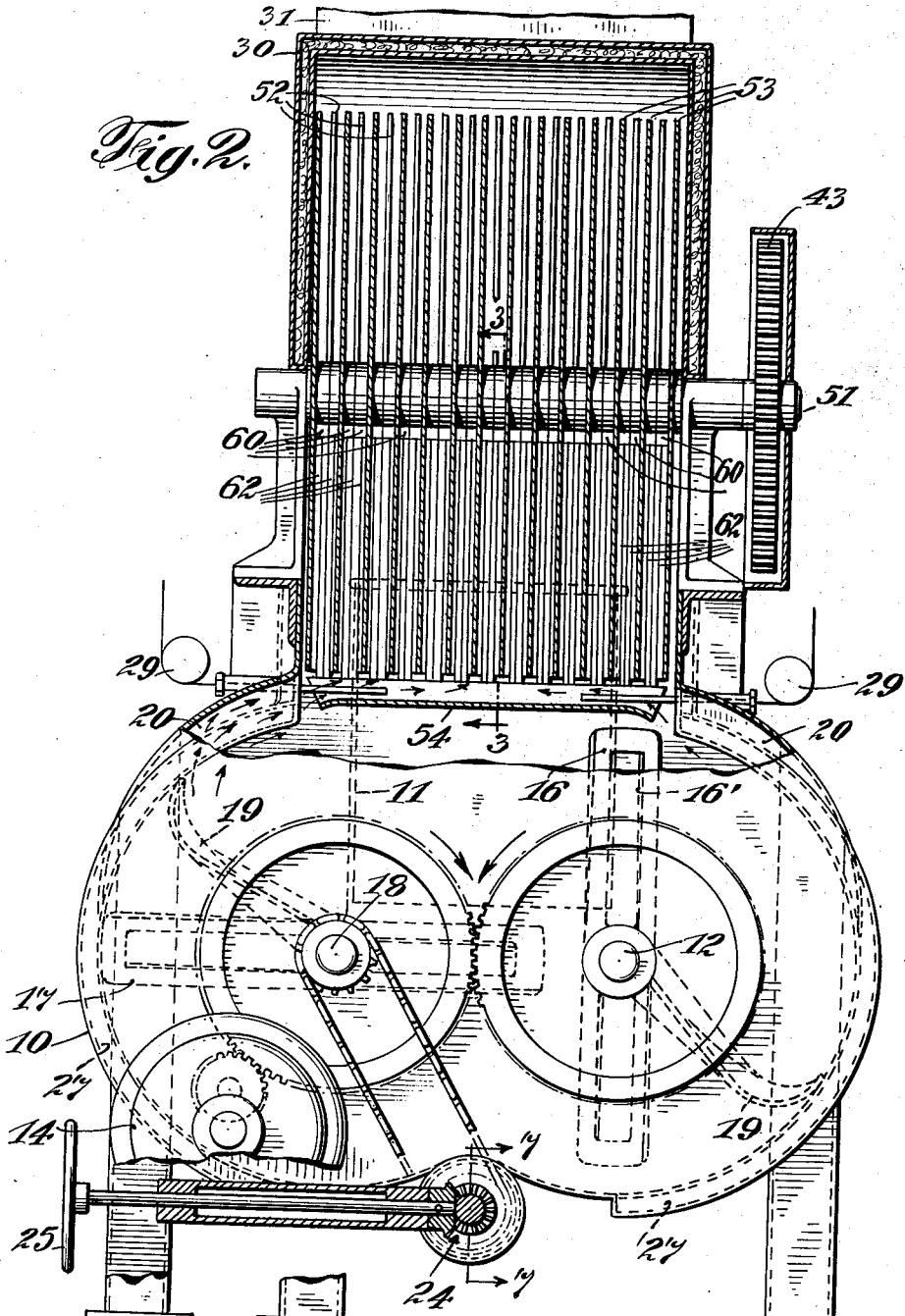
Figure 2 is a vertical transverse section thereof taken on line 2—2 of Figure 1.

Referring to the drawings, the casing 10 of the beater contains a hopper-like feed 11, into which the raw or unconched chocolate or cocoa is supplied. Within the casing 10 is a shaft 12 supported on bearings 13, and driven by a motor 14 with gear connection 15. Upon the shaft is a series of blades 16. Each of these blades is so arranged as to have a short and long part, the longer part contacting with the inner circumference of the cylindrical part of the casing 10, as shown in Figure 2. Each blade has a cut-out 16'. Between these series of blades, but disposed upon another shaft 18, parallel with the first shaft 12, are similar blades 17. Each shaft carries spoon type paddles 19 disposed in the central part of the casing 10 between the sets of blades 16 and 17, which paddles when they are rotated are in line with the space between the parallel walls 20 extending downwardly into the casing 10.

Below the blades 16, 17, and paddles 19, a worm conveyor 22 is provided, and a discharge gate control 24 operated by a hand wheel 25, controls the discharge of the material passing out of the pipe 26. The casing 10 is suitably waterjacketed as at 27. Temperature control bulbs 29 are provided to control the jacket temperature.

The rotation of the blades 16 and 17 of the beater described is substantially continuous, as the chocolate or cocoa is of greatest value the more it is mixed.

To facilitate a betterment in the chocolate or cocoa, there is arranged above these series of blades and paddles, an upward extension 30 on the casing 10. This extension 30 has air inlets 31 and 32 for the funnels 33 and 34 in which thermo-controlled heaters may be placed, but which are not shown, as such thermo-controlled heaters are old and are not claimed herein. The lower openings of these funnels 33 and 34 are provided with dampers 35 and 36. Between these funnels air outlet valves 37 and 38 are provided, which control the exhaust of the air through a pipe 39, under the action of a suction device 40 operated by the motor 41.

Within the extension 30 of casing 10, two parallel shafts 50 and 51 are arranged which have their ends 42 provided with gears 43. One of these gears is rotated by the pinion 45, rotated by the sprocket 46, chain 47, and motor 48. These shafts 50 and 51 are supported in suitable bearings in the walls of the extension 30.

Figure 1:
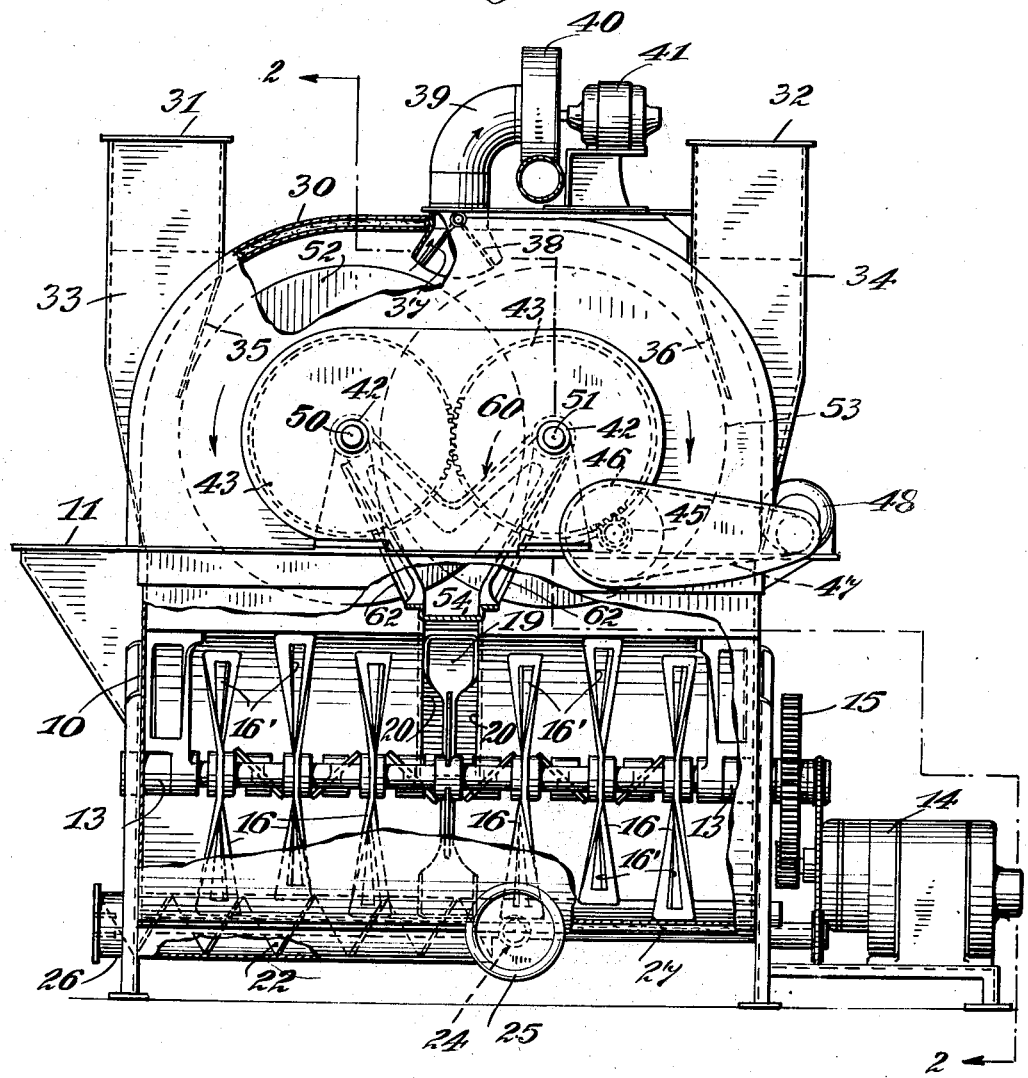
Figure 1 is a vertical side view of the improved machine.

Upon each of shafts 50 and 51, are fixed a plurality of thin discs 52 and 53. One of these sets 52 is on the shaft 50 and the other set on the shaft 51, and they are so disposed that the one set intermeshes with the other at their inner parts, without contacting with each other. They are relatively of large diameter as will be seen from Figures 1 and 2.

The rotation of the spoon paddles 19 feeds the material into a trough 54, then to the discs which are covered with thin layers of material, the thickness of which layers is controlled by the gauges 60 shown in Figures 3 and 4. The depth of the layers or their thickness is determined by the gauge arrangement 60 which consists of a plurality of plates which extend along the discs suitably spaced therefrom to determine the thickness of the layer of material on the discs. Each flattening device 60 is substantially conical in cross-section, and is placed in the space between two adjacent discs 52 and 53 as shown in Figure 4. It will be noted that the apex of this conical portion points downwardly against the direction of rotation of the discs 52 and 53, as is clearly seen in Figure 3. It will also be noted that the member 60 in the view shown in Figure 3 has a substantially conical bite formed by the walls extending downwardly at inclinations to the horizontal, which walls are supported by the shafts 50 and 51.

After the discs are covered with thin layers of material, these layers are then subjected to the action of air in the extension 30. The spread-out condition of the thin layers subjects the material to the beneficial actions of the air. These relatively large layers of considerable thinness on the discs are subjected to aeration of about one revolution.

When the discs have almost completed their revolution, the material is scraped off by scrapers 62 shown in detail in Figure 5, and the scraped off material drops into the beater casing 10 where it is again subjected to the action of the blades and spoon paddles and is again thrown upon the discs. This action is in continuous cycle until the material reaches that degree of refinement and character as desired.

From the foregoing, it will be seen that the distribution of the material upon thin discs in thin layers facilitates aeration and aids considerably in hastening the material to attain its desired refinement in the casing 10, and the combination of such discs and the beater brings about a conditioning of the material in a quicker and better manner than was possible in equipment in use heretofore.

The use of the improved machine consisting of a combination of beater and aeration disc or discs reduces the time necessary to put the material in the best possible condition.

It is obvious that various changes and modifications may be made in the details of construction and design of the above specifically described embodiments of this invention without departing from the spirit thereof, such changes and modifications being restricted only by the scope of the following claims.

What I claim is:

1. A conche machine, comprising a casing, a beater in said casing, a housing above said casing, a plurality of discs in said housing disposed above the casing, means for throwing the material beaten by the beater to the discs, means for regulating the amount of material on said discs, and means for scraping off material from said discs, whereby after the material in the casing has been subjected to beater action and thrown on the discs, the material on the discs is subjected to an aerating action and then returned to the beaters and subjected to further beating and throwing action under continuous interchange of beating and throwing action and aerating action.

2. A conche machine, comprising a beater casing, a housing cooperatively arranged with respect to the beater casing and provided with air inlet and outlet openings, a plurality of beaters in the casing for subjecting the material therein to a beating action, and moving the material to the central part of the casing, a spoon shaped member driven with the beaters, and arranged in the central part of the casing, a plurality of discs in said housing above the beaters, spaced from the spoon shaped member to receive the material thrown thereby, means for regulating the amount of material on the discs, and means for scraping off the material from the discs, whereby said spoon shaped members throw the beaten material upon the discs in a fine layer and the material is subjected to an aerating action.

3. A conche machine, comprising a beater casing, a housing cooperatively arranged with respect to the beater casing and provided with air inlet and outlet openings, a shaft on said casing, means for rotating the shaft, two sets of beater blades upon said shaft, each set adapted to drive the material during beating toward the central part of the casing, a spoon shaped member on said shaft disposed between the two sets of beaters, means for receiving material thrown by the spoon shaped member, a plurality of discs above the receiving member, and positioned to receive the material thrown by the spoon shaped member, means for regulating the amount of material upon the discs, means for scraping off the material from the discs, and means for guiding the scraped off material to the beater casing, whereby the material is successively and continuously beaten, thrown upon the discs, subjected to an aerating action while on the discs, and returned to the beater casing until the material reaches the desired consistency.

4. A conche machine, comprising a beater casing, a housing cooperatively arranged with respect to the beater casing and provided with air inlet and outlet openings, two pluralities of discs intermeshing with each other and spaced from each other so as to be out of contact with each other, parallel shafts for said discs, a shaft on said casing at right angles to the shafts of the discs, means for rotating the shaft, two sets of beater blades upon said shaft, each set adapted to drive the material during beating toward the central part of the shaft, a throw member disposed between the two sets of beater blades for receiving the beater material and throwing it upon the discs, means for regulating the amount of material upon the discs, means for scraping off the material from the discs, and means for guiding the scraped off material to the beater casing, whereby the material is successively and continuously beaten, thrown upon the discs, subjected to an aerating action while on the discs, and returned to the beater casing until the material reaches the desired consistency.

5. A conche machine, comprising a beater casing, a housing cooperatively arranged with respect to the beater casing and provided with air inlet and outlet openings, a plurality of beaters in said casing, a shaft for said beaters, means for ejecting the material in the casing on said shaft, a plurality of discs above the casing adapted to receive the material ejected from the beater casing by said ejecting means, said plurality of discs consisting of two sets, each set having a shaft with the discs intermeshing, without contacting said shafts being at right angles to the shaft of the beaters, a thickness regulating device supported by said shafts and disposed between adjacent discs, scrapers supported by said shafts and acting upon said discs, and means for rotating the beaters and the discs, whereby material is thrown on the discs and scraped off therefrom and returned to the beater until it attains its desired consistency.

6. In combination, a beater, a thrower, and means for subjecting material acted upon by the beater and received from the thrower, after passing through the air, to an aerating action and returning the material after being aerated to the beater in a continuous process of interchange until the desired refinement of the material has been obtained.

7. A conche machine, comprising a beater, an adjacent disc for aerating in thin film form the material from the beater, means for throwing through the air the material from the beaters to the disc, and means for returning the film on the disc to the beater for further working therewith.

8. A conche machine, comprising a beater, a disc device adjacent the beater, means for moving the material of the beater through the air to the disc device, means for returning the material on the disc device to the beater, and means limiting the thickness of the film on the disc device.

9. A conche machine, comprising in combination, a beater, an aerating device disposed at a higher elevation than the beater, and means to throw material from the beater upward to the aerating device.

10. A conche machine, comprising in combination, a beater, aerating discs disposed at a higher elevation than the beater, means to throw material from the beater upward to the discs, and means for returning aerated material from the discs to the beater.

11. A conche machine, comprising in combination, a beater, an aerator, active driven means for passing material from the beater to the aerator, and means for passing material from the aerator to the beater, the beater being of a size to move the material in substantially the entire space in the beater chamber, the aerator keeping substantially all of the material in the aeration chamber in movement, and the passages being so disposed relative to the beating chamber, the aeration chamber and the means for passing material, that substantially all of the material except that undergoing aeration is in a zone of action of active agitating means.

12. A conche machine, comprising in combination, a beater in a chamber open to a supply of air, an aerator, and means for passing the material in short paths from the beater to the aerator and back while constantly keeping it within a zone of action of active agitating or moving means.

PAUL HOLLSTEIN.